June 29, 1965 B. A. SARAFINAS ETAL 3,192,090
METHOD OF MAKING NOZZLE STRUCTURES
Original Filed Jan. 2, 1962
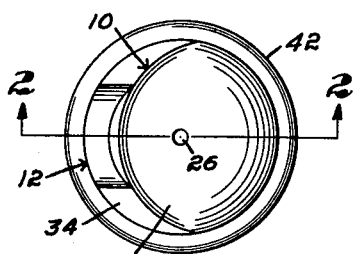
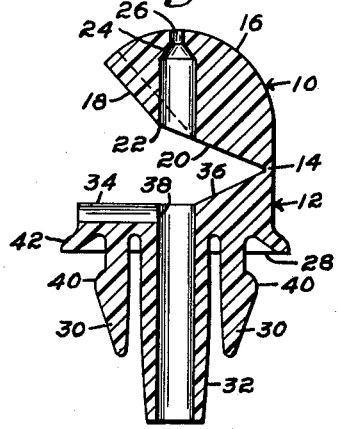
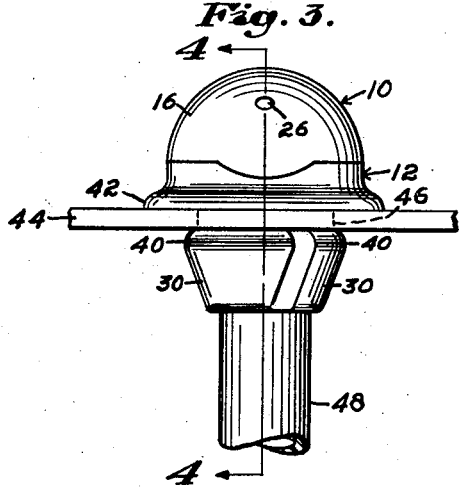
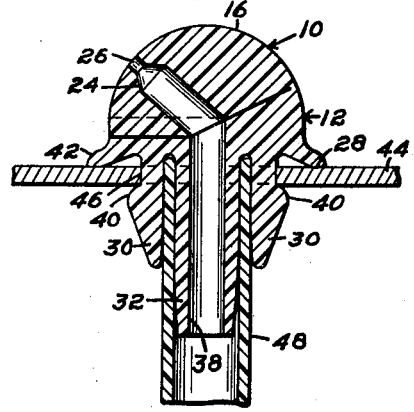
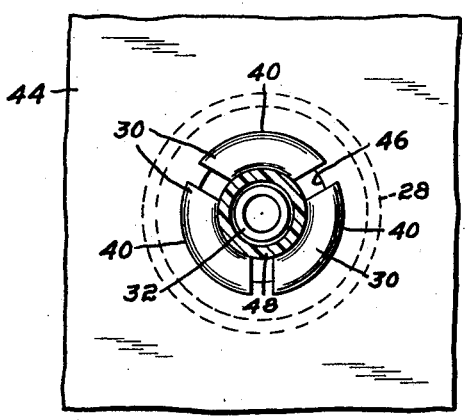
Inventors:
Bruno A. Sarafinas &
John E. Searle Jr.,
by Walter S. Jones
Atty.

3,192,090
METHOD OF MAKING NOZZLE STRUCTURES

Bruno A. Sarafinas, Saugus, and John E. Searle, Jr., Marblehead, Mass., assignors to United-Carr Incorporated, a corporation of Delaware
Original application Jan. 2, 1962, Ser. No. 163,600. Divided and this application Sept. 24, 1962, Ser. No. 225,680
2 Claims. (Cl. 156—217)

This invention relates generally to the method of making windshield nozzles and particularly to an all plastic windshield nozzle.

This application is a division of pending United States application, Serial No. 163,600, filed January 2, 1962 and now abandoned.

In the drawings:

FIG. 1 is a top plan view of the nozzle prior to sealing;

FIG. 2 is a section taken on line 2—2 of FIG. 1;

FIG. 3 is a side elevation of the nozzle after sealing and engaged with a support;

FIG. 4 is a section taken on line 4—4 of FIG. 3; and

FIG. 5 is a bottom plan view of the nozzle and support shown in FIG. 3.

Referring to the drawing, there is shown a windshield nozzle, or the like, comprising a head portion 10 and a base portion 12 connected by a connector portion 14 and formed as a molded flexible plastic unit.

The head portion 10 comprises an arcuate cap element 16 which is substantially semicircular in configuration and which has a tongued surface 18 and an engaging surface 20 in angular relation to the surface 18 as shown in FIG. 2. An inlet wall 22 defining an aperture is formed through the engaging surface 20 and extends through the head portion 10. To increase the force of the cleaning jet stream, a Venturi 24 is formed in the inlet wall 22 a predetermined distance from the engaging surface 20 terminating in an outlet port 26.

The base portion 12 has a support engaging edge 28. Three legs 30 extend from the base portion 12 and are spaced from each other and surround, in spaced relation, a tubular element 32. The upper surface of the base portion 12 comprises a grooved contact surface 34 in substantially right angle relationship with the axis of the tubular element 32 and an angular surface 36 which is formed in integral angular relationship with the contact surface 34 as shown in FIG. 2. An inner wall 38 defining an aperture is formed through the contact surface 34 and extends throughout the tubular element 32. The legs 30 are formed with engaging elements 40.

An annular sealing ring 42, if required, may be formed at the periphery of the base portion 12 and extend in the same general direction as the legs 30 and in circumscribing spaced relation to a portion of the legs 30.

The axis of the tubular element 32 and the aperture formed by the inlet wall 22 are coincident in the original position as shown in FIG. 2.

The tongued surface 18 is formed originally in spaced angular relationship with the grooved contact surface 34 and the engaging surface 20 is formed in acute angular relationship with the angular surface 36. In the first position shown in FIG. 2, the head portion is spaced from the base portion with the exception of the narrow area in which the two portions are connected by the connector portion 14.

The method of making the nozzle, described above, is to first mold the head and base portions in separated relation and then force the head portion 10 toward the base portion 12 utilizing the connector portion 14 as a hinge and place the engaging surface 20 into superposed abutting relationship with the angular surface 36 and also place the surface 18 into superposed abutting relationship with the contact surface 34. This will automatically place the axis of the aperture formed by the inlet wall 22 into an angular relationship with the axis of the tubular element 32 as best shown in FIG. 4. Electrical heat-seal devices may be used to adhere the surface 18 and the engaging surface 20 to the contact surface 34 and the angular surface 36 respectively. Obviously, any of the well-known plastic adhesives may also be used for "gluing" the head portion 10 to the base portion 12. The tongue and groove shapes of the surfaces 18 and 34 will provide an interlock between the head and base portions 10 and 12 to help keep the parts in alignment, as shown by FIGS. 3 and 4.

The nozzle may now be engaged in an aperture formed in a support 44 by flexing the legs 30 down through the wall 46 forming the aperture in the support and having the engaging elements 40 locked underneath the support in a manner which will sandwich the support between the engaging elements 40 and the annular sealing ring 42. A carrying tube 48, having an internal diameter, slightly smaller than the external diameter of the tubular element 32 is press-fitted on the tubular element 32 so that it is, for part of its length, sandwiched between the inner surface of the legs 30 and the outer surface of the tubular element 32.

Since certain other obvious modifications may be made in the invention without departing from the scope of the invention, it is intended that all matter contained herein be interpreted in an illustrative and not in a limiting sense.

We claim:

1. A method of making a nozzle structure including the steps of molding a head section having a central aperture and a base portion having a central aperture, each of said portions joined by an integral narrow connection and being in substantially spaced apart relation, forcing the head portion toward the base portion by utilizing the connection as a hinge, thereby placing the axis of the aperture of the head portion in angular relationship with the aperture of the base portion.

2. A method of making a nozzle structure including the steps of simultaneously forming an apertured head section and a centrally apertured base section, at least one of said apertures having a constriction formed adjacent one end thereof and at least one of said sections having fastening means formed thereon for snappingly engaging an apertured support, each of said sections being substantially spaced from each other along opposed nonparallel surfaces having mating tongue on one section and a groove member on the other section associated therewith, said sections being integrally joined at an edge to provide a connector; forcing said sections into surface-to-surface engagement along said opposed surfaces utilizing said connector as a hinge such that said tongue and groove members mate and said apertures are angularly aligned to provide a continuous passage through said structure; and adhering said sections to one another.

References Cited by the Examiner

UNITED STATES PATENTS

| 2,252,539 | 8/41 | Adams | 156—212 |
| 2,468,656 | 4/49 | Forest | 156—285 |
| 2,947,653 | 8/60 | Foehr | 156—217 |
| 2,975,092 | 3/61 | Hagerty | 156—212 |

FOREIGN PATENTS 877,253   9/61   Great Britain.

ALEXANDER WYMAN, *Primary Examiner.*

EARL M. BERGERT, *Examiner.*